(12) United States Patent
Yaghoubi

(10) Patent No.: US 11,180,254 B2
(45) Date of Patent: Nov. 23, 2021

(54) SPACE-EFFICIENT FLAT-BED SEATING ARRANGEMENT

(71) Applicant: AirGo Design Pte., Ltd., The Central Singapore (SG)

(72) Inventor: Alireza Yaghoubi, Kuala Lumpur (MY)

(73) Assignee: AirGo Design Pte., Ltd., Singapore (SG)

( * ) Notice: Subject to any disclaimer, the term of this patent is extended or adjusted under 35 U.S.C. 154(b) by 46 days.

(21) Appl. No.: 16/421,997

(22) Filed: May 24, 2019

(65) Prior Publication Data
US 2020/0369387 A1   Nov. 26, 2020

(51) Int. Cl.
*B64D 11/06* (2006.01)
*B64D 11/00* (2006.01)

(52) U.S. Cl.
CPC ...... *B64D 11/0601* (2014.12); *B64D 11/0015* (2013.01); *B64D 11/0606* (2014.12); *B64D 11/0627* (2014.12); *B64D 11/0638* (2014.12); *B64D 11/0641* (2014.12)

(58) Field of Classification Search
CPC ............ B64D 11/0601; B64D 11/0606; B64D 11/0638; B64D 11/0615; B60N 3/063; B60N 2/34; A47C 7/5062; A47C 1/035
See application file for complete search history.

(56) References Cited

U.S. PATENT DOCUMENTS

| | | | | |
|---|---|---|---|---|
| 507,270 A | * | 10/1893 | Hirschfeld | A47C 7/5064 297/423.22 |
| 902,092 A | * | 10/1908 | Latimer | A47C 7/506 297/423.24 |
| 1,790,884 A | * | 2/1931 | Thum | A47C 7/506 5/21 |
| 2,185,813 A | * | 1/1940 | Johnson | A47C 7/5062 297/423.23 |
| 2,328,411 A | * | 8/1943 | Bergstrom | A47C 17/2076 5/48 |
| 2,604,146 A | * | 7/1952 | Martin | A47C 7/5064 297/423.22 |
| 5,179,447 A | * | 1/1993 | Lain | B60N 3/00 348/837 |
| 5,779,310 A | * | 7/1998 | Suskey | A47C 17/2073 297/118 |
| 6,481,798 B2 | | 11/2002 | Romca et al. | |
| 6,592,179 B1 | | 7/2003 | Miyazaki | |
| 6,669,143 B1 | | 12/2003 | Johnson | |
| 6,776,457 B2 | | 8/2004 | Muin et al. | |
| 7,134,729 B2 | | 11/2006 | Dowty et al. | |
| 7,188,895 B1 | | 3/2007 | Espina et al. | |

(Continued)

FOREIGN PATENT DOCUMENTS

| | | | | |
|---|---|---|---|---|
| CA | 3033918 A1 | * | 2/2018 | ......... B64D 11/0604 |
| DE | 19946967 A1 | * | 4/2001 | ........... A47C 7/5062 |

(Continued)

*Primary Examiner* — Timothy J Brindley
(74) *Attorney, Agent, or Firm* — Knobbe, Martens, Olson & Bear, LLP

(57) ABSTRACT

A variety of seats and seating arrangements are disclosed for use in transport vehicles such as airliners. The seats can have specific features and/or be arranged at specific angles adjacent to each other to combine high capacity with passenger comfort and safety.

14 Claims, 9 Drawing Sheets

(56) References Cited

U.S. PATENT DOCUMENTS

| | | | |
|---|---|---|---|
| 7,611,198 B2 | 11/2009 | Schweizer | |
| 8,020,936 B2 | 9/2011 | Asami et al. | |
| 8,540,309 B2 | 9/2013 | Berger et al. | |
| 8,702,163 B2 | 4/2014 | Westerink et al. | |
| 8,911,018 B2 | 12/2014 | Gaither et al. | |
| 8,944,505 B2 | 2/2015 | Khalil et al. | |
| 9,045,096 B2 * | 6/2015 | Procter | B60R 11/0235 |
| 9,469,400 B1 | 10/2016 | Irmen | |
| 10,293,943 B1 * | 5/2019 | Pozzi | B64D 11/0627 |
| 2002/0070314 A1 * | 6/2002 | Schmidt-Schaeffer | B60N 2/34 244/118.6 |
| 2004/0099766 A1 | 5/2004 | Pratt, Jr. | |
| 2004/0232283 A1 * | 11/2004 | Ferry | B60N 2/309 244/118.6 |
| 2005/0052067 A1 * | 3/2005 | Grimm | A47C 1/035 297/423.2 |
| 2005/0206206 A1 | 9/2005 | Peng | |
| 2006/0075934 A1 | 4/2006 | Ram | |
| 2009/0104596 A1 | 4/2009 | Assadi-Porter et al. | |
| 2012/0139303 A1 | 6/2012 | Westerink et al. | |
| 2012/0212012 A1 | 8/2012 | Berger et al. | |
| 2012/0292973 A1 | 11/2012 | Westerink et al. | |
| 2013/0099543 A1 * | 4/2013 | An | A47C 7/5062 297/354.1 |
| 2014/0167461 A1 | 6/2014 | Cailleteau | |
| 2015/0225086 A1 * | 8/2015 | Darbyshire | B64D 11/06 244/118.6 |
| 2016/0152169 A1 | 6/2016 | Zheng et al. | |
| 2016/0159481 A1 | 6/2016 | Gianakopoulos et al. | |
| 2016/0176356 A1 | 6/2016 | Krikorian et al. | |
| 2016/0249073 A1 | 8/2016 | Margis et al. | |
| 2016/0250362 A1 | 9/2016 | Mackin | |
| 2016/0297530 A1 * | 10/2016 | Simeon | B61D 1/04 |
| 2017/0088267 A1 * | 3/2017 | Dowty | B64D 11/06 |
| 2018/0035803 A1 * | 2/2018 | Carrera | A47C 7/506 |
| 2018/0281959 A1 | 10/2018 | Braca et al. | |
| 2019/0077512 A1 * | 3/2019 | Bentley | B64D 11/064 |
| 2019/0241269 A1 * | 8/2019 | Martin | B64D 11/0636 |
| 2019/0300177 A1 * | 10/2019 | Nicholas | B64D 11/0641 |
| 2019/0308731 A1 * | 10/2019 | Pozzi | B64D 11/0643 |
| 2020/0015596 A1 * | 1/2020 | Carrera | A47C 7/5068 |
| 2020/0172248 A1 | 6/2020 | Chavarria Garcia | B64D 11/0602 |

FOREIGN PATENT DOCUMENTS

| | | | | |
|---|---|---|---|---|
| DE | 202014100070 U1 * | 4/2015 | | A47C 7/506 |
| EP | 2 289 734 B1 | 10/2011 | | |
| EP | 3228220 A1 * | 10/2017 | | A47C 7/5062 |
| FR | 3059951 A1 * | 6/2018 | | B64D 11/0601 |
| GB | 2412310 A * | 9/2005 | | B60N 2/206 |
| GB | 2510765 | 8/2014 | | |
| WO | WO-2010144420 A1 * | 12/2010 | | B64D 11/0606 |
| WO | WO-2013144845 A2 * | 10/2013 | | B60N 3/002 |
| WO | WO-2016165978 A1 * | 10/2016 | | B60N 3/002 |
| WO | WO-2018178246 A1 * | 10/2018 | | B64D 11/0601 |
| WO | WO-2018178276 A1 * | 10/2018 | | B64D 11/0606 |
| WO | WO-2018187071 A1 * | 10/2018 | | B64D 11/0638 |
| WO | WO-2019126685 A1 * | 6/2019 | | B60N 3/002 |

* cited by examiner

SPACE-EFFICIENT FLAT-BED SEATING ARRANGEMENT

BACKGROUND

Field

The present disclosure relates to seats, including passenger seats for various vehicles as well as placement of relevant accessories such as inflight entertainment, meal trays, and storage compartments. The disclosure can be particularly relevant to airline premium cabins where space is limited, and long-term comfort is essential.

Description of the Related Art

In a commercial airplane, floor space is very limited and as a result, it is often valued above anything else. Airlines are always looking for more space-efficient designs to keep their ticket prices competitive. Many airlines used to take advantage of the "lie-flat" beds in their premium cabin whereby the seats had an average recline of 160° and enabled a compact arrangement. In more recent years however, this approach has been rendered obsolete due to increased competition. Fully-flat beds with 180° recline are now commonplace. However, such fully-flat beds occupy more floor space. It is therefore important that a balance between density and comfort is achieved.

A typical business class layout today accommodates 24 passengers in zone A of a B777-200 or -300. The simplest design involves front-facing seats with no overlapping floor space. Some airlines (Emirates for example) utilized this layout on their B777 fleet with a 2-3-2 arrangement which could accommodate 28 passengers in zone A, although a sizable 10 passengers did not have direct aisle access which is especially troublesome at night. More recently these seats have been replaced with a 2-2-2 arrangement which offers the basic 24 seats. Even then, the 6 window seats (except for the front row) do not have direct aisle access.

In contrast, the so-called "staggered" design provides direct aisle access for every seat while maintaining the same 24 passenger capacity. In this arrangement, the seats can be positioned along the longitudinal axis of the cabin, but the passenger legs while asleep are placed under the utility compartment of the seat in front of them. Another high-density arrangement is known as the "herringbone" where the seats are often placed at a 45 degree angle with respect to the longitudinal axis of the cabin. These seats provide better privacy due to the placement of walls on both sides of each seat, but they are not ideal for couples and families separated by the walls and, furthermore, some passengers may find the walled spaces claustrophobic. A third arrangement is referred to as the "backward-forward facing" wherein every other row faces backward. Most passengers however prefer front-facing seats either to avoid motion sickness or because they do not want to face other passengers.

In 2018, a new design ("Optima" cabin by Safran) tackled the problem of space efficiency by using a staggered design with 3 different seating angles with respect to the longitudinal axis of the cabin. The arrangement adds an extra row to achieve a total capacity of 28 seats on B777-200 and -300, while maintaining front-facing seats and direct aisle access for all passengers.

The densest arrangement by far is a "backward-forward facing" approach where the passengers on the inner section of the middle row have a shared aisle access and therefore need to take turns to move in and out of their seats. This design, known commercially as "Aria" by Optimares SpA, enables a remarkable 32 seats in zone A of B777-200 or -300.

Despite significant progress in recent years, airlines are still in search of a highly efficient seating arrangement for their premium cabin while preserving passenger comfort. Passenger comfort can be improved by including features such as a fully-flat bed, dedicated and uninterrupted aisle access for every passenger, not facing backward, privacy while not feeling claustrophobic, family-friendly designs, and offering a general comfort level comparable to that of traditional business class seats.

SUMMARY

In one embodiment, a highly efficient seating arrangement uses a hybrid layout, where all seats have direct aisle access, face forward and offer a fully-flat bed. This particular arrangement uses a total of 4 seating angles; a staggered design which is positioned at ±17° to ±27° with respect to the longitudinal axis of the cabin, and a herringbone design positioned at ±52 to ±62° with respect to the longitudinal axis of the cabin, to accommodate up to 38 passengers in zone A of a B777-200 or -300.

The staggered design is especially suitable for window seats given that its optimal angle ensures the tapered portion of the cabin is not utilized and hence a fully straight and consistent aisle width of at least 17" is provided. This arrangement also gives more space at the vicinity of doors which could help with faster boarding and evacuation.

Furthermore, the position of the window seats and the inflight entertainment system, allows the privacy walls to be lowered during takeoff and landing, and natural light to brighten the cabin. During the flight, neighboring passengers can lower the walls using a two-way authentication system to share the space.

In one embodiment, a plurality of flat-bed seats can be arranged adjacent to each other in a "herringbone" configuration along an aisle of a transport vehicle. Each of the seats can include a seat bottom and a backrest. The seat bottom can be configured to receive the lower posterior of a person seated. The backrest can be configured to receive the back of the person seated when the backrest is in an upright position. The backrest can also be configured to pivot to a reclined position allowing the person seated to move to a laying-down position supported by the seat bottom and the backrest. The plurality of seats can be arranged along the aisle at an angle between 52° to 62° with respect to the aisle. The seats can also have a seat pitch no less than 25 inches.

In a further embodiment, a plurality of flat-bed seats can be arranged adjacent to each other in a "staggered" configuration along an aisle of a transport vehicle. Each of the seats can include a seat bottom, a backrest, an amenity compartment, and a fixed footrest. The seat bottom can be configured to receive the lower posterior of a person seated. The backrest can be configured to receive the back of the person seated when the backrest is in an upright position. Further, the backrest can be configured to pivot to a reclined position, allowing the person seated to move to a laying down position supported by the seat bottom and the backrest. The plurality of seats can be arranged along the aisle at an angle between 17° and 27° with respect to the aisle. The fixed footrest can be positioned under the amenity compartment of an adjacent seat, such that the person in a laying down position rests their feet on the footrest.

The "herringbone" and "staggered" seat arrangements can also be used in hybrid layouts. For example, in a tapered portion of a cabin in twin aisle airliners, the "herringbone" seats can be symmetrically placed with one column of seats by windows on each side while the "staggered" seats can be symmetrically placed in two adjacent columns of seats in a middle section. In a straight portion of a cabin in twin aisle airliners, the "herringbone" seats can be symmetrically placed with two columns in a middle section while the "staggered" seats can be symmetrically placed with one column of seats by windows on each side. In other twin aisle airliners, the "herringbone" and "staggered" seats can be placed asymmetrically with respect to a central axis of the airliner.

In single aisle airliners the "herringbone" seats or the "staggered" can be symmetrically placed with one column of seats by windows on each side.

BRIEF DESCRIPTION OF THE DRAWINGS

A more thorough understanding of the present disclosure may be achieved by referring to the detailed description and claims along with the accompanying figures.

DETAILED DESCRIPTION

The following description is merely illustrative in nature and is not intended to limit the embodiments of the invention or the application thereof. Moreover, there is no intention to be bound by any expressed or implied theory presented in the preceding technical field, background, brief summary or the following detailed description.

Figure 1:
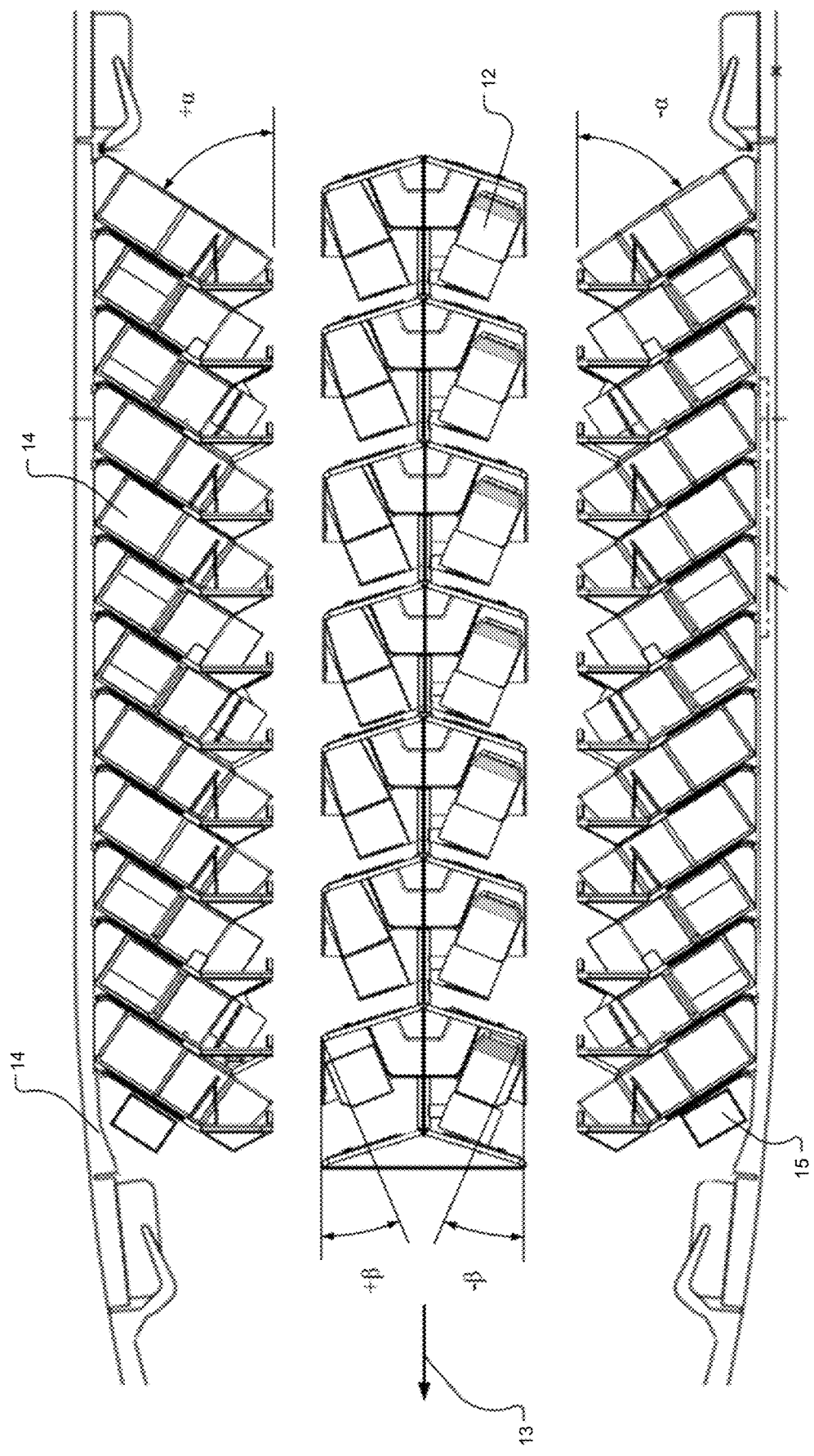
FIG. 1 shows a hybrid seating arrangement with a maximum capacity of 38 passengers in zone A of a current generation B777 with aisle width of at least 17 inches.

FIG. 1 demonstrates a placement of seats in zone A of a current generation B777. A total of 24 herringbone seats 11 are arranged at an angle α equal to 57°±5° and 14 staggered seats 12 are arranged at an angle β equal to 22°±5° with respect to the longitudinal axis of the cabin 13. The seats are additionally arranged along the aisle, which can be straight, such that the seats are collectively disposed along an axis while also individually disposed at an angle to the axis. Thus, for example, a plurality of herringbone seats 11 described herein, each having a bed length of at least 5 feet, can have a seat pitch (a distance from a given point on a first seat to an equivalent point on an adjacent seat) along an axis parallel to the aisle. This seat pitch can optionally be no less than 25 inches. Each individual seat 11 can additionally have a width of at least 20 inches. Further the bed formed by the seat can optionally have a right trapezoidal shape, such that the bed has a major length along a longer side, and a minor length along a shorter side parallel to the longer side. The minor length can optionally be at least 5 feet and the major length can optionally be at least 6 feet.

The herringbone seats 11 and the corresponding single-row arrangement shown in FIG. 1 are especially suitable for window seats in zone A and D of the current generation B777 where the tapered part of the fuselage 14 in conventional designs forces the aisle width to be narrower in this region. In the current design on the other hand, due to the optimal angle α, the space is efficiently utilized and the aisle width is consistent throughout the cabin. This arrangement also leaves enough space for flight attendant seats 15 to be incorporated in the same dense layout. Furthermore, the particular placement of window seats provides a wider living space in the vicinity of doors, making boarding and evacuation more convenient.

Figure 2:
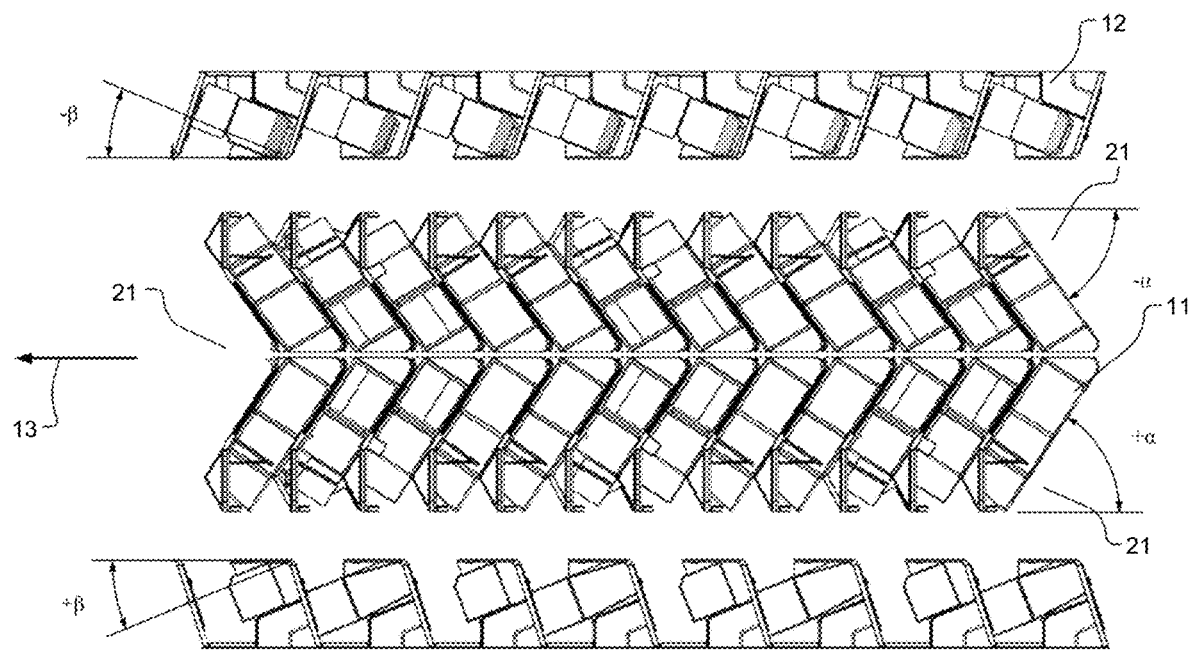
FIG. 2 shows a reversed hybrid seating arrangement which can be more suitable for zones B and C of B777 and offer extra floor space for installation of galleys.

In a straight portion of the cabin (zone B and C in the B777), one can apply a reverse configuration where the herringbone seats 11 are in the middle and staggered seats 12 are by the windows. This arrangement is demonstrated in FIG. 2 and it provides extra space 21 for placement of galleys.

Figure 3:
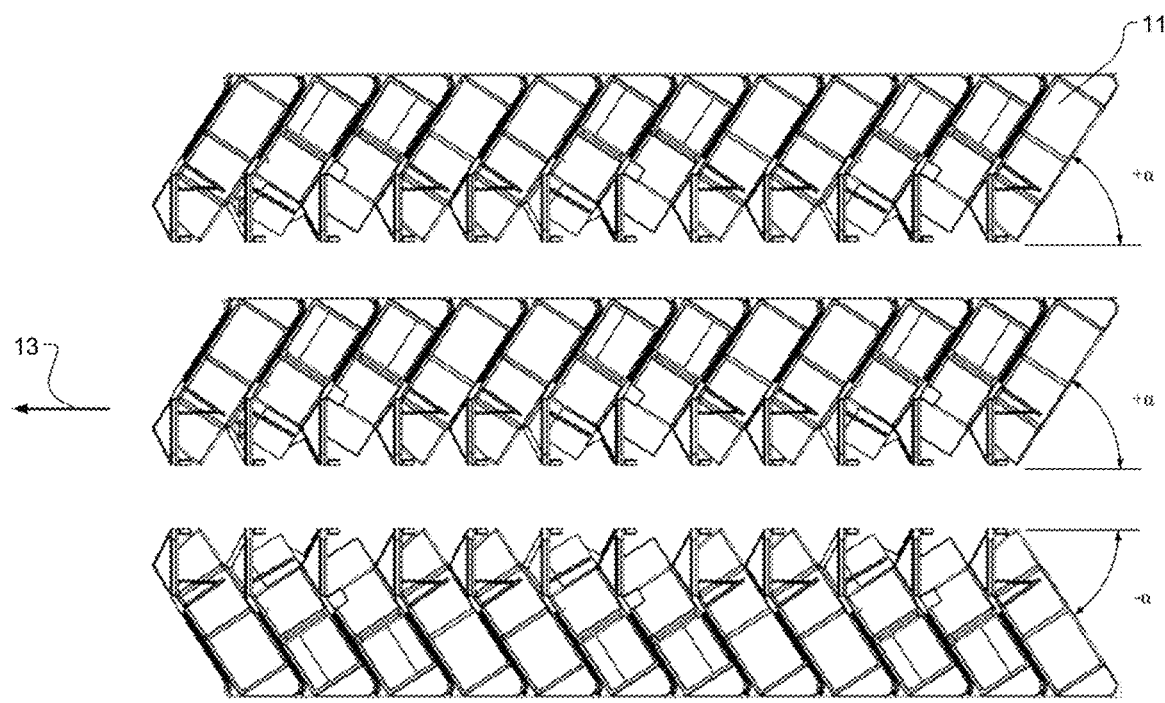
FIG. 3 shows a seating arrangement for mid-size widebody airliners such as A350 or A330 with a herringbone arrangement.

The herringbone 11 and staggered 12 variants are not necessarily used together. In smaller twin-aisle airliners like the A350 or A330, there is less space. Alternatively, three rows of herringbone seats 11 can be arranged in a similar manner, as shown in FIG. 3. In this case, the middle row can be placed at an angle of α with respect to the longitudinal axis of the cabin 13 (facing toward either side of the fuselage).

Figure 4:
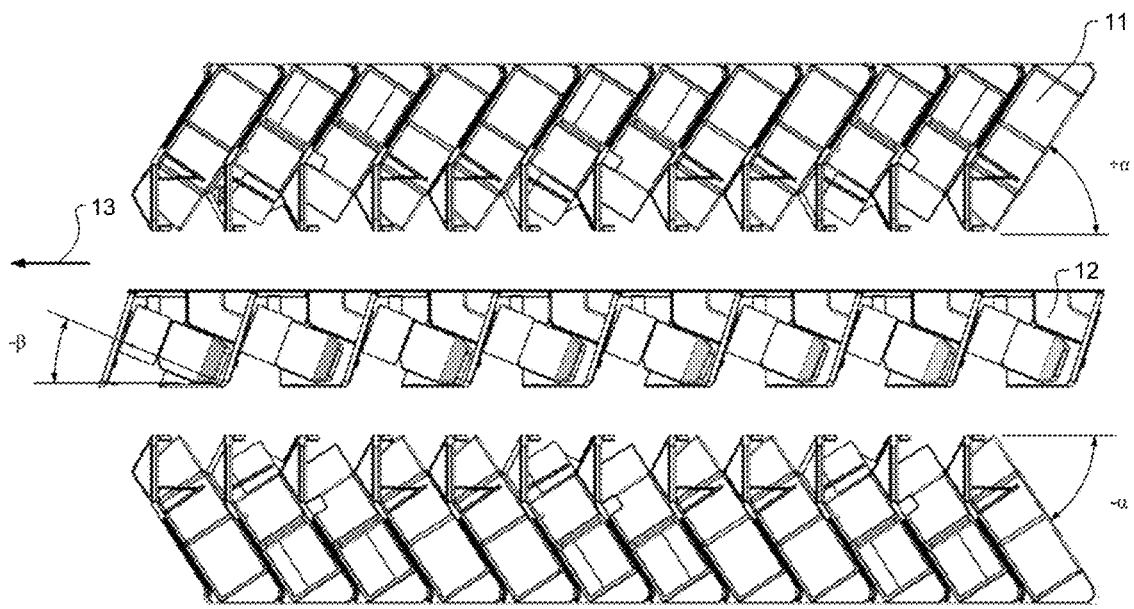
FIG. 4 shows a seating arrangement for smaller mid-sized airliners such as B787 with both herringbone and staggered variants.

In airliners with even smaller cabin width, such as the B787, one can utilize both herringbone 11 and staggered 12 arrangements, but in an asymmetric fashion. This is further demonstrated in FIG. 4 and similar to the previous case, the middle row can be placed at an angle of β with respect to the longitudinal axis of the cabin 13.

Figure 5:
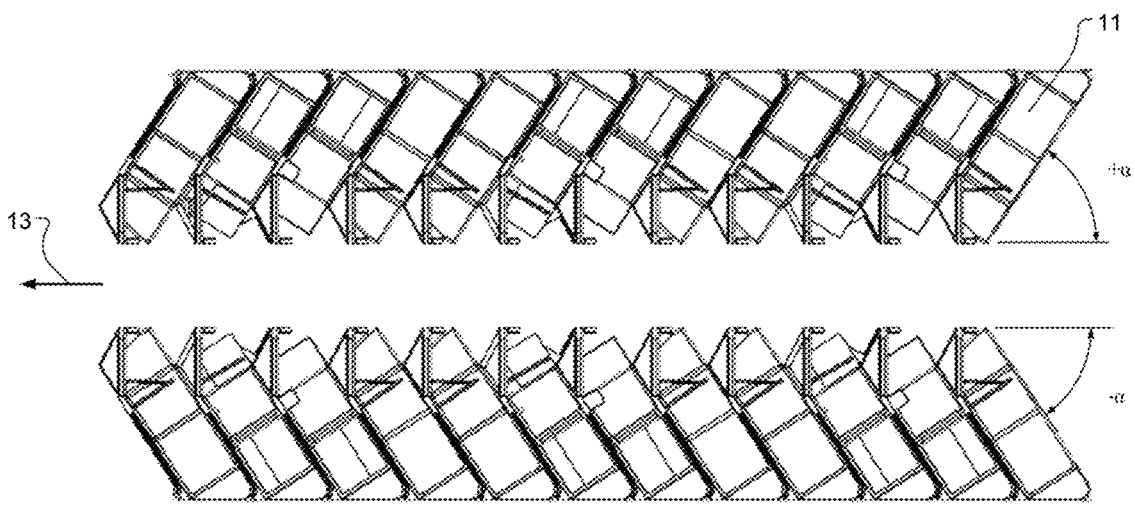
FIG. 5 shows a seating arrangement for single-aisle airliners such as A320.

A similar approach can be applied even to single-aisle airliners. FIG. 5 demonstrates the particular arrangement of seats in A320 where one row of herringbone seats 11 is used on each side of the aisle.

Figure 6:
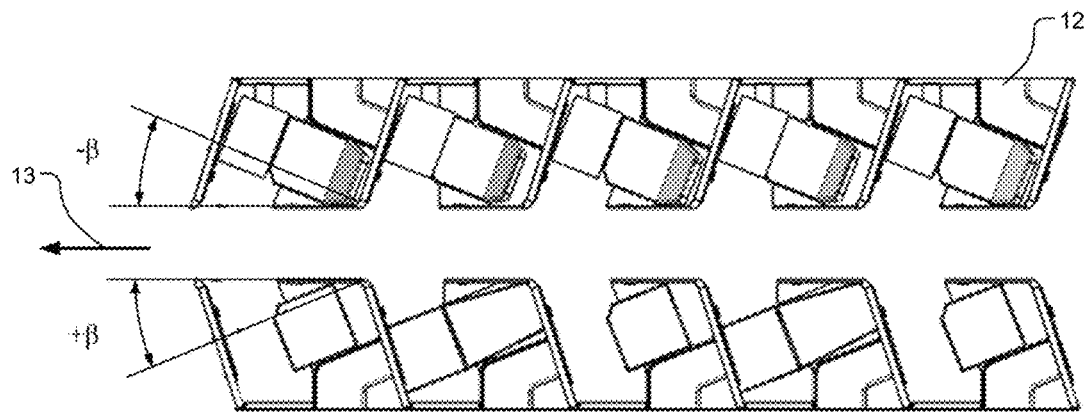
FIG. 6 shows a seating arrangement for small regional airliners such as Fokker 50 as well as mid-size business jets such as Embraer Legacy or Dessault Falcon.

Other aircraft, for example small regional airliners such as Fokker 50 or mid-size business jets such as Embraer Legacy and Dessault Falcon may utilize staggered seats 12 as shown in FIG. 6.

Figure 7:
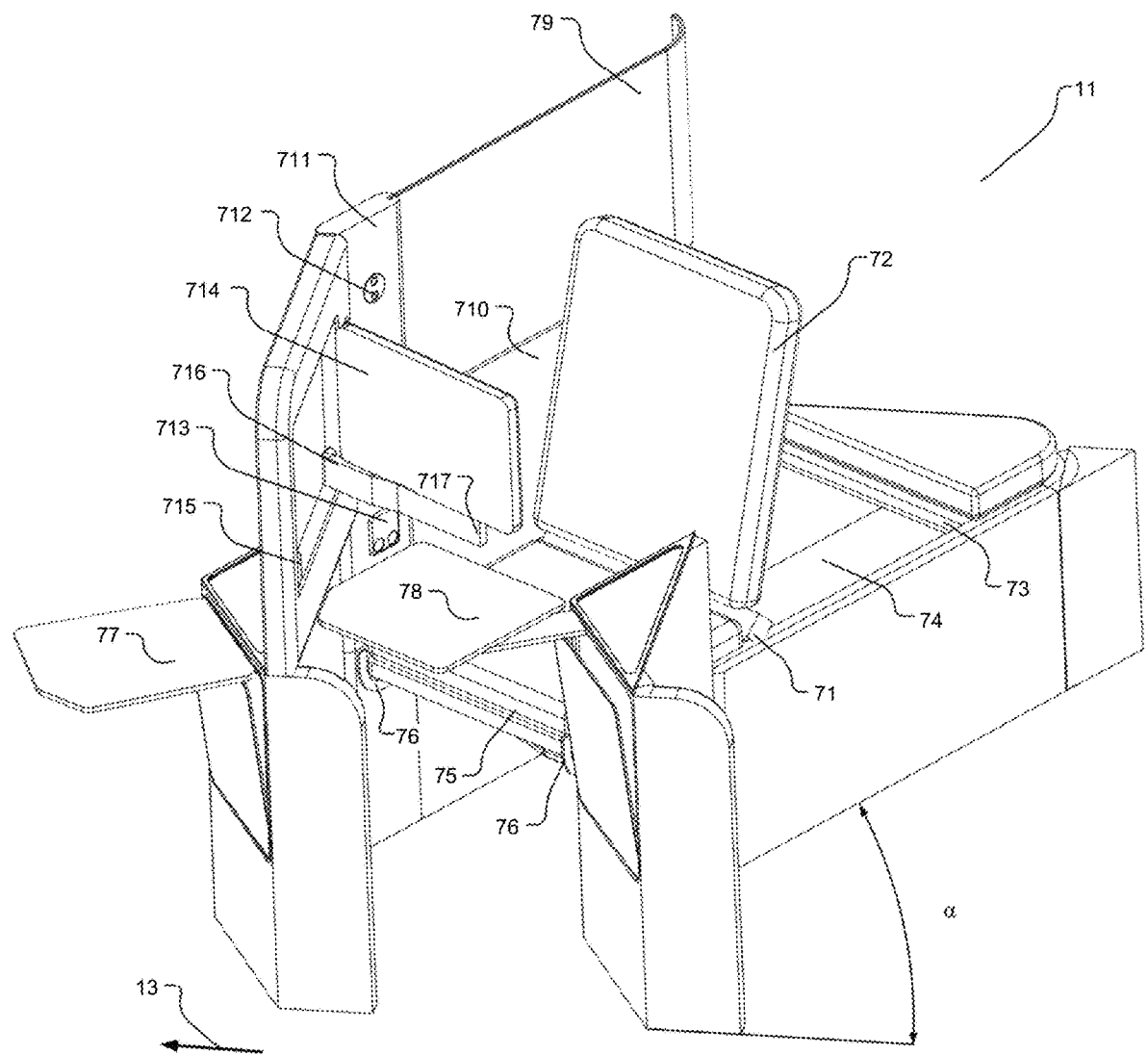
FIG. 7 shows details of a herringbone seat in an upright configuration.

FIG. 7 shows a detailed view of a herringbone seat 11 in an upright configuration. The seat can optionally have a fixed base instead of a sliding mechanism that would otherwise occupy significant space. A pivot 71 allows the backrest 72 to rotate rearwardly into a reclined position, optionally without a sliding movement. In this position, the backrest 72 can be supported by a frame 73.

Figure 8:
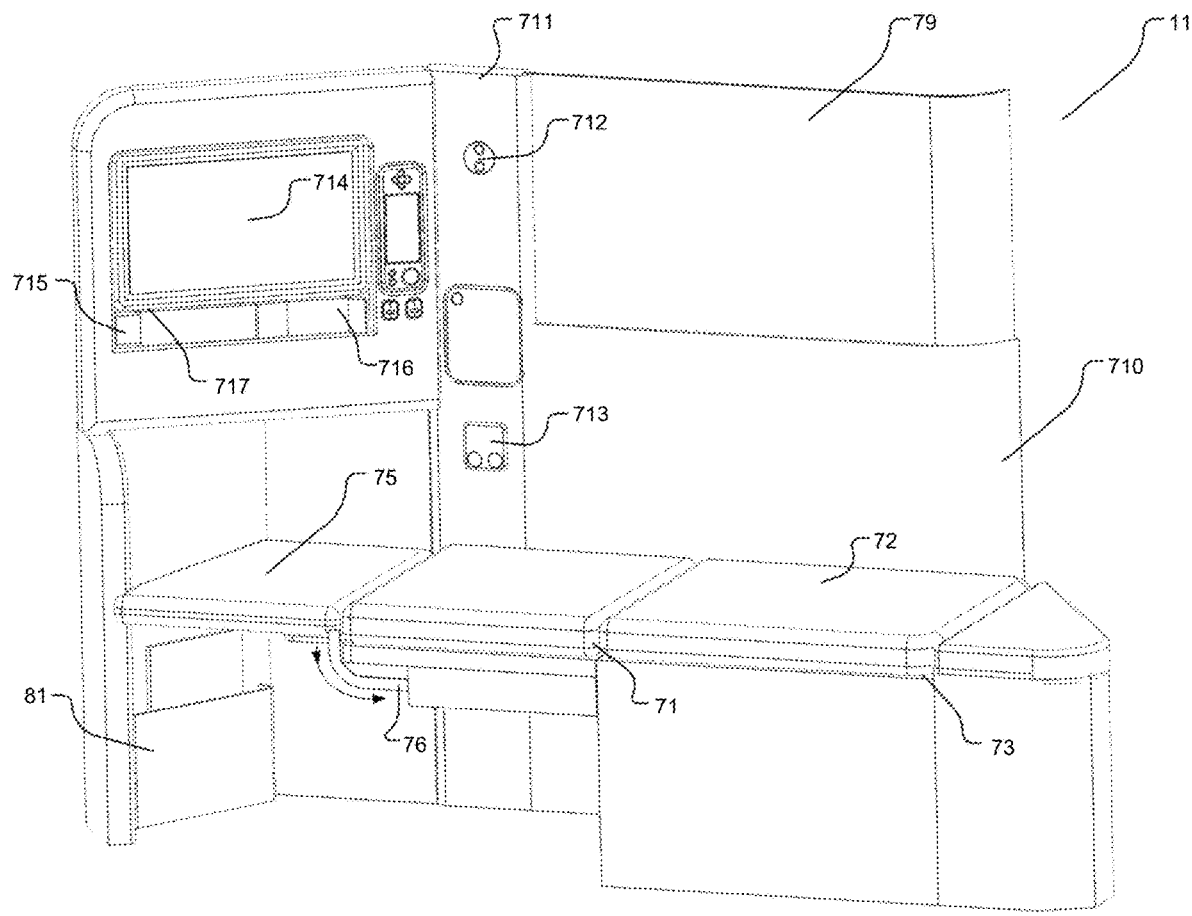
FIG. 8 shows details of the herringbone seat in a flat-bed, or reclined, configuration.
Figure 9:
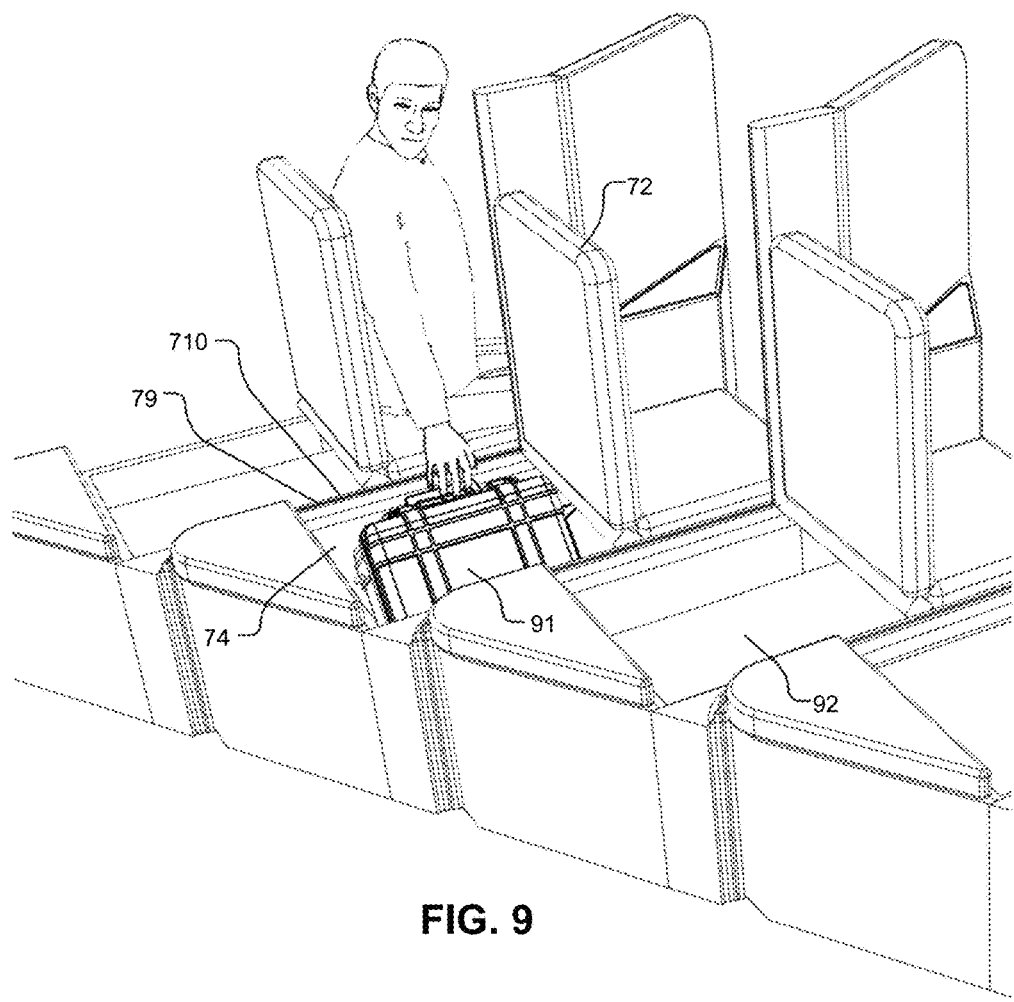
FIG. 9 shows the accessibility of the dedicated storage space in adjacent herringbone seats.

The space under the backrest 72 can be used as a first storage space 74. The space 74 can be located generally behind and below the seat bottom (on which the person's posterior rests when seated), and be a substantially enclosed space defined by the frame 73 and the backrest 72 when the backrest is in the reclined position supported by the frame (as best shown in FIG. 8). This space 74 can receive a variety of items, although in some embodiments it will be preferable to store lightweight and/or bulky items such as mattresses and pillows. The space can optionally have a size of at least 40 Liters. A person can then recover the items by reaching over the backrest while it is in the upright position. An alternative way of accessing the space 74 is demonstrated in FIG. 9. This is especially suitable if items stored in the space 74 are heavy (for example a carry-on bag 91) and the recovery by reaching over the backrest 72 may be difficult. In this arrangement, the backrest 72 can potentially block access to the space 74 when not in the upright position, and therefore access could be limited or completely unavailable during the flight. A lateral sliding panel 92 configured to cover the space 74 can optionally be equipped with a proximity sensor that can refuse access and ensure that the items stored in the space 74 will not stop the backrest 72 from fully reclining.

The herringbone seat 11 can additionally include a footrest 75, best shown in FIGS. 7 and 8. The footrest 75 can be stowed under the seat bottom while the seat 11 (and the backrest 72) are in the upright position. The footrest can then be automatically deployed (for example, by a motorized mechanism when the backrest is moved to the reclined position), such that the footrest slides along a pair of guide rails 76 to create a fully flat bed. The footrest 75 can additionally include a pivot allowing rotation relative to its connection along the guide rails 76, such that it can be in a horizontal position while underneath the seat bottom. This arrangement allows for easy access to a second storage space beneath the seat bottom while the footrest is either stowed (allowing a normal seated position) or deployed (completing a fully flat bed), which can optionally be combined with the first storage space 74 (behind and below the seat bottom) or separated from the first storage space by a dividing wall. Optionally, personal belongings as well as a life vest can be stored in this second storage space under the seat.

In addition to a simplified bed deployment, placement of the seat 11 in the vicinity of the aisle has several other benefits. For example, as can be seen for example in FIG. 1, each seat provides direct access to the aisle, unlike other seating designs that require navigating over an adjacent seat or otherwise share access to the aisle with other seats. The arrangement of the seats 11 can also allow for a tray table 77 to be positioned closer to the aisle where the flight attendant would be able to conveniently serve the meal and then use an articulated arm to rotate the tray table to a dining position 78, as best shown in FIG. 7. The tray table 77 can be stowed in a vertical position along a portion of the seat 11 facing the aisle. The tray table 77 can then be deployed to into two horizontal positions, the deployed-aisle position where a flight attendant can easily access the table and the dining position substantially in the lap of a person seated in the seat 11.

Figure 10:
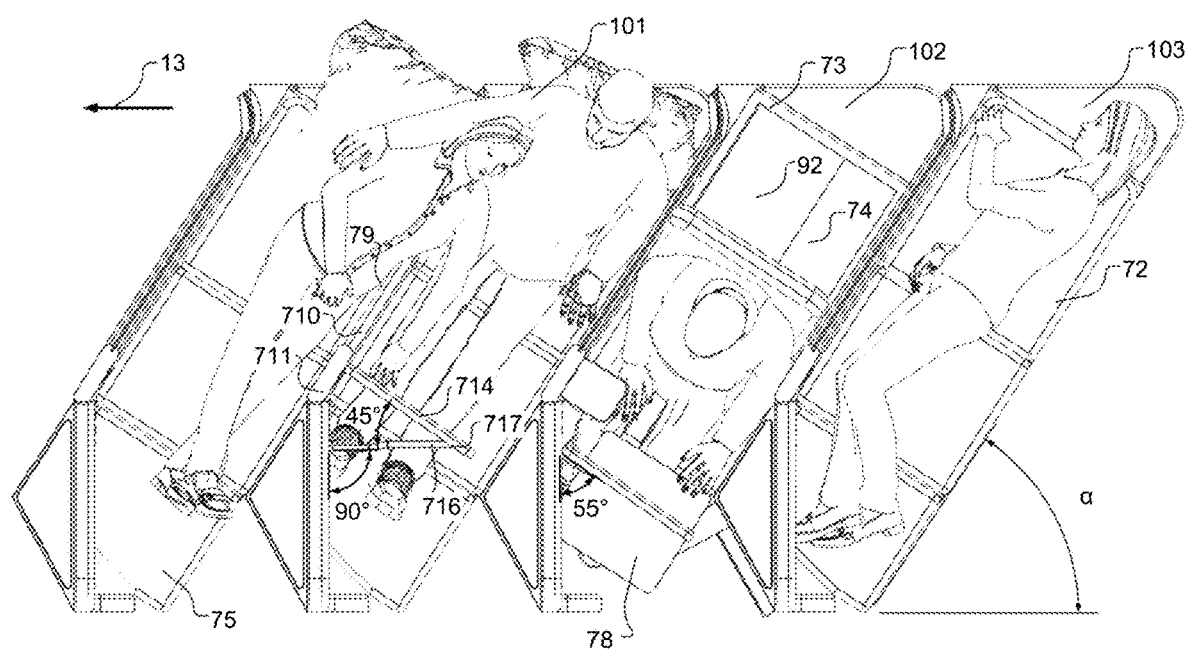
FIG. 10 is a top view of adjacent herringbone seats with various postures and usage scenarios.
Figure 11:
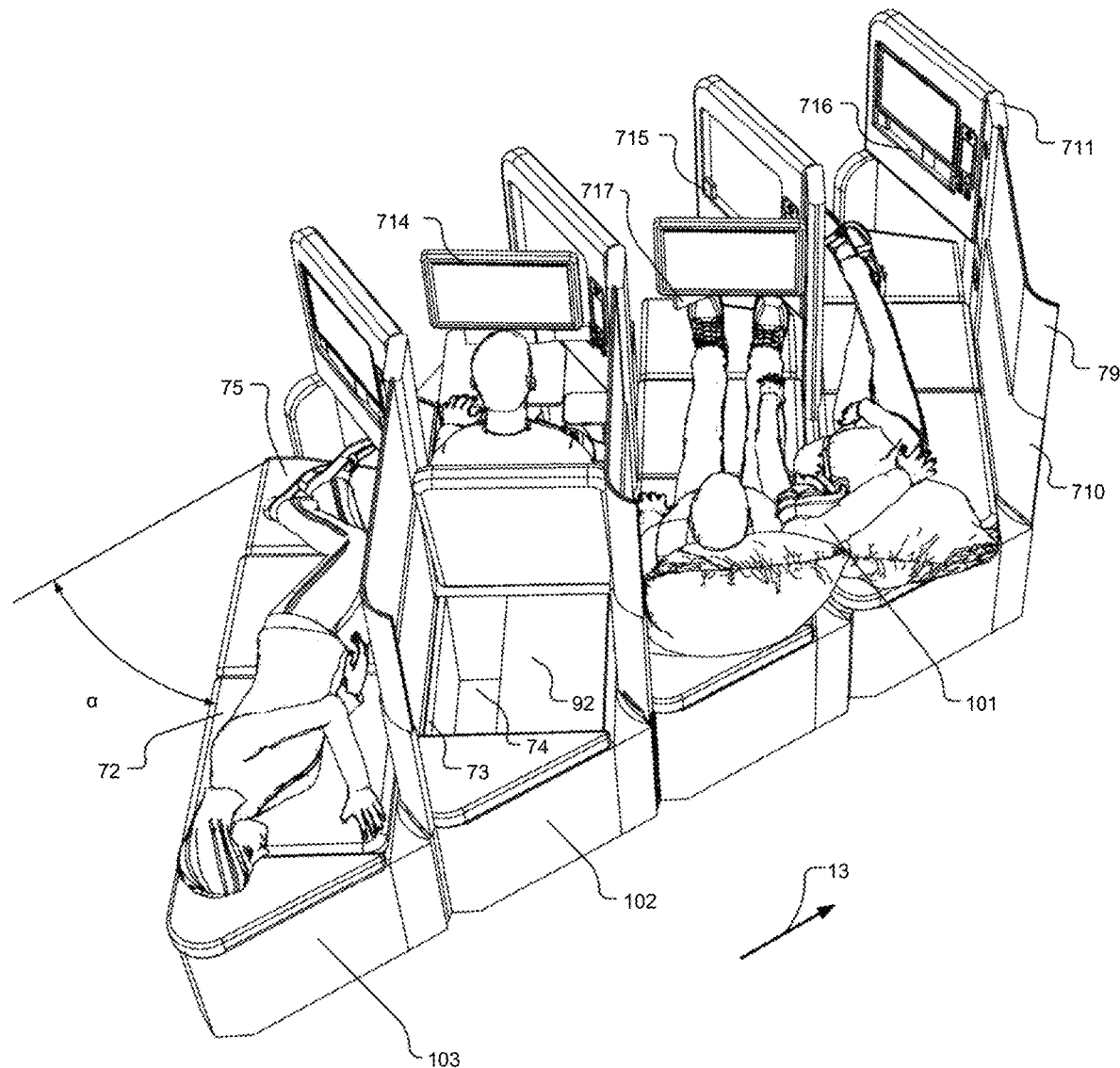
FIG. 11 is a perspective view of adjacent herringbone seats with various postures and usage scenarios.

One of the drawbacks of common herringbone design is the high privacy walls which could be claustrophobic for certain passengers or could render these seats inappropriate for couples or families with small children. By placing the seat near the aisle, it is possible to have a set of privacy walls 79, 710 that could be lowered on demand using a two-way authentication system. The walls 79, 710 can be positioned in a rearward portion of the seat 11, extending substantially from the seat bottom portion of the seat to a region behind the backrest 72 in the upright position. Further, the walls 79, 710 can also optionally be flat. During boarding, takeoff and landing the walls can optionally be automatically lowered to let natural light disperse in the cabin and give the impression of a more spacious environment to the passengers. During the flight on the other hand, the walls can optionally be fully raised by default. A passenger can use an inflight entertainment system or otherwise a dedicated button to send a request to neighboring passengers to lower the wall. The neighboring passenger can then either accept or decline this request. This feature can prevent unwanted interactions or harassment. The wall can be further comprised of two portions: a translucent and non-transparent top portion 79 to allow light to pass and brighten the cabin, and an opaque lower portion 710. The sizes of these portions can vary depending on preferences for additional privacy and additional spreading of natural light. Neighboring passengers can mutually decide whether they want to lower only the top portion or the whole wall. Further, a portion 711 of the privacy wall could be fixed to accommodate standard features such as a reading light 712, inflight entertainment display 714, and seat control unit 713 at a convenient distance from a sitting passenger. As shown the fixed portion of the wall 711 can be in a forward portion of the seat 11, generally extending in front of the seat bottom and toward the aisle. FIGS. 10 and 11 provide a more detailed view of the privacy wall and how it affects passenger experience.

As best seen in FIGS. 7 and 8, the inflight entertainment display 714, might not be placed at an appropriate viewing angle by default. The passenger however can use a release button 715 to deploy an articulated arm 716 rotating about a base pivot and further adjust the angle by rotating the screen 714 around an integrated pivot 717. The use of an articulated arm 716 having two pivots can allow the inflight entertainment display 714 to be moved to a variety of locations (e.g., a stowed position and a viewing position) and angles (for viewing or storage). In further embodiments, additional points of adjustment or rotation can also be included. For example, the two pivots in the depicted example are in the same plane adjusting a yaw direction of the display 714, but in some embodiments an additional pivot can be provided allowing the display's pitch to be adjusted.

FIG. 8 shows a detailed view of the herringbone variant 11 in 180° flat-bed configuration. Here, the movement of the backrest 72 around the pivot 71 and the structural support provided by the peripheral frame 73 is more clearly visible. The position of the sliding footrest 75 with respect to the guide rail 76 after deployment can also be seen. The arrow shows the movement of the footrest as it goes into stowage. The footrest moves downward and then backward along the guide rail into the housing under the seat bottom using a lockable motion control system such as a rack and pinion actuator. Furthermore, a literature pocket 81 can be integrated into the front panel. The screen 714 and the articulated arm 716 are shown in their stowed position.

FIG. 10 is a top view of neighboring herringbone seats 11 showing various postures and usage scenarios. The couple 101 for example has lowered the privacy walls (both the top 79 and bottom 710 portions) to share a common space. To facilitate the sharing of space in this manner, a longitudinal offset between two adjacent seats in the herringbone configuration can optionally be less than 25 inches. Such minimal offsets can be accomplished, for example, by arranging the seats at an angle no shallower than the range for the angle α discussed above. The angle α can also be chosen to be no greater than the range discussed above to reduce the lateral span of a column of the seats 11 (a length perpendicular to the axis of an aisle, for example), which can for example be no greater than 70 inches to preserve space for aisleways and additional seats in the same row of a plane or other vehicle (such as a train, bus, or boat). A single entertainment display 714 has been positioned using the articulated arm 716 (here at 90°) and the integrated pivot 717 (here at 45°) so that the couple can watch contents together. In comparison, the seat 102 shows an upright sitting posture where the articulated arm 716 is not fully extended toward the passenger (here at 55° while the integrated pivot 717 is at the default 0° position) and hence the inflight entertainment display 714 is positioned at the center of the viewing angle.

FIG. 11 demonstrates these aspects from a different viewing angle. The couple 101 has only lowered the middle wall, while the walls on the sides are fully raised to provide privacy. The seat 103 further shows the relative position of a passenger when fully lying down.

It should be emphasized that a balanced angle α with respect to the longitudinal axis of the cabin 13 allows many benefits. A smaller angle would hinder space-sharing while a larger angle would not offer the same passenger density.

Figure 12:
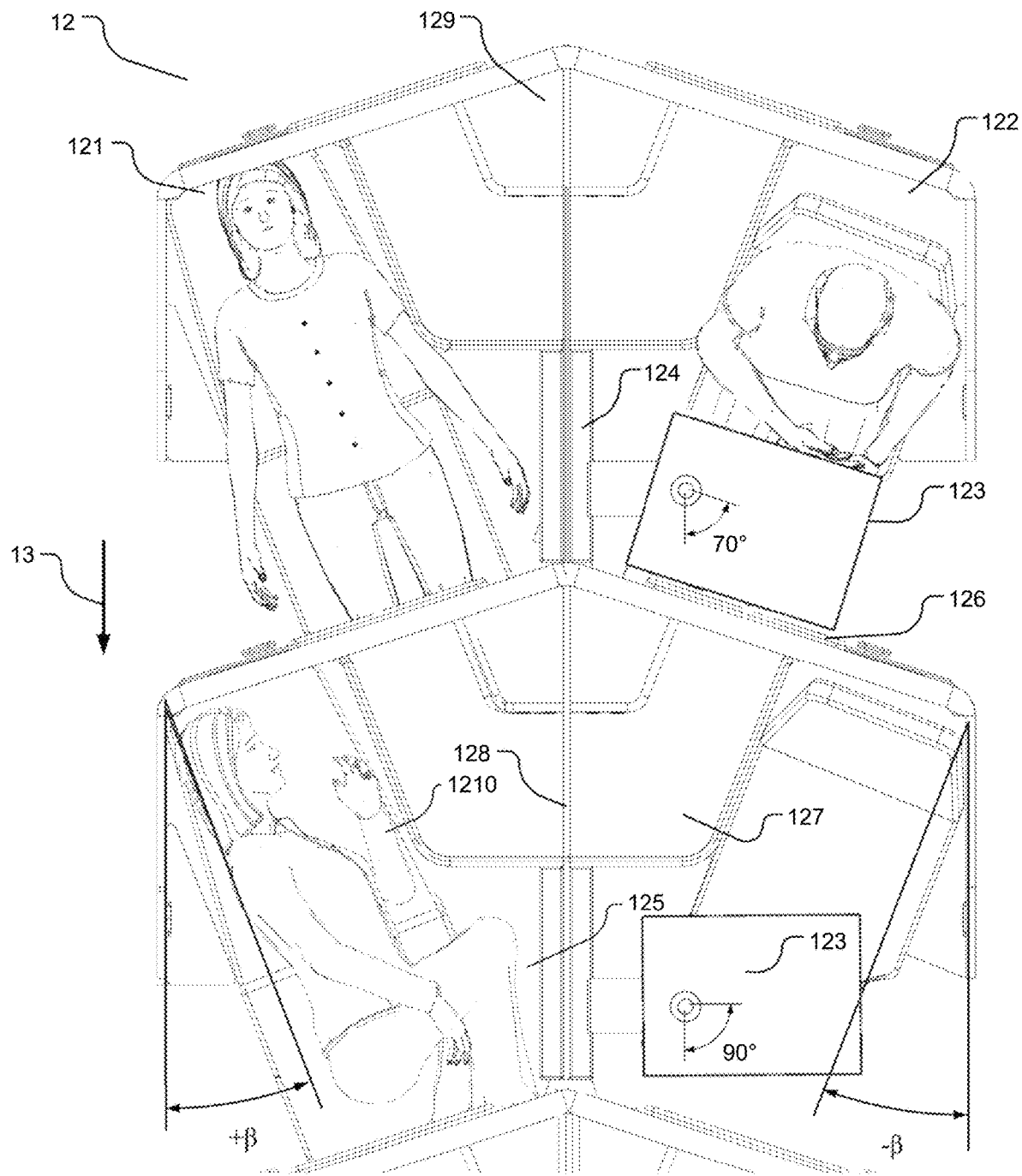
FIG. 12 is a top view of neighboring staggered seats with various postures and usage scenarios.

FIG. 12 is a top view of neighboring staggered seats 12 with various postures and usage scenarios. The passenger 121 is shown in a sleeping position while passenger 122 is sitting upright. Unlike conventional designs, here, the tray table 123 can be stowed in a vertical orientation in a dedicated housing 124 which is parallel to the longitudinal axis of an aircraft 13 or aisle thereof, rather than at the seat angle β. As a result, the tray table 123 can be initially positioned at a 90° angle with respect to housing 124 immediately after deployment. An integrated pivot on the extension arm can then allow the table 123 to move into a more comfortable dining position (here in the figure, 70° with respect to housing 124). A slide can further allow the table to be pulled closer to the passenger. This feature provides an extra living area 125. The space below this area could optionally be used for storage of a life vest.

The optimal angle β with respect to longitudinal axis of the cabin 13 provides a larger seat width and bed length, while increasing passenger density. It also enables the inflight entertainment display 126 to directly face the passenger, without the need for an articulated arm, being at a 90° angle with respect to the axis of the seat. Further, the frontward wall on which the inflight entertainment display 126 sits can extend from the display to the aisle and be substantially flat in that region. This can facilitate a large and accessible pathway for access from the seat to the aisle, while also avoiding drawbacks of existing designs such as a loss of space behind the display 126 that would be created if deployed on an articulated arm, and not limiting the size of the screen to a limited flat portion of the wall. Upon extension, the passengers' legs in this configuration are placed under a compartment 127 of an adjacent seat in front of the passenger's seat, which is further divided into two segments using a privacy wall 128. This privacy wall could be made either of a translucent and not transparent, or opaque material. The enclosed space 129 can further be used to store amenities. The extra living area 125 can be furnished with an upholstered platform which can be level with the bed and hence enable the passenger 1210 to assume a fetal position during sleep. This is vastly different from current designs where the passenger can only sleep in a straight line.

Figure 13:
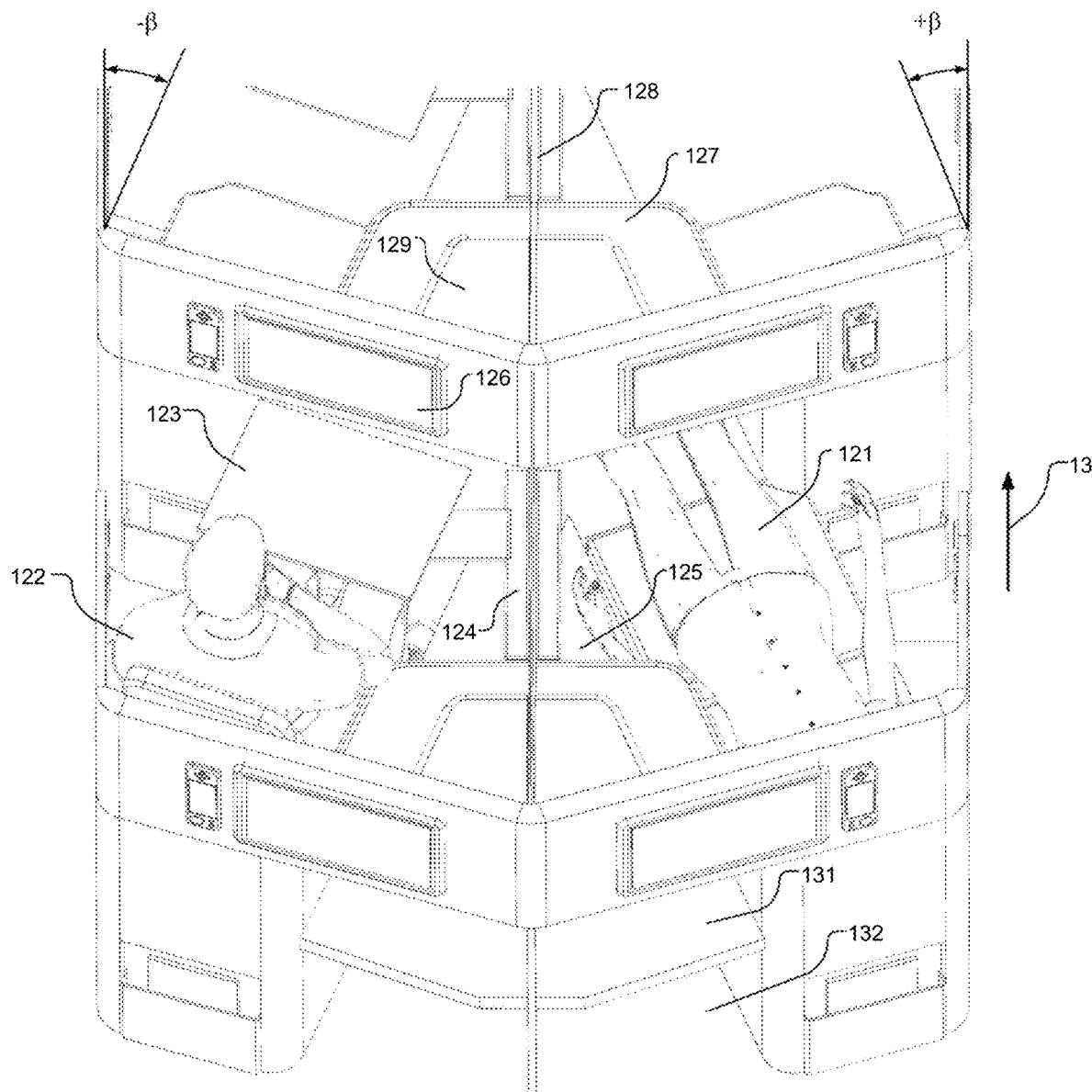
FIG. 13 is a perspective view of neighboring staggered seats with various postures and usage scenarios.

FIG. 13 is a perspective view of neighboring staggered seats 12 with various postures and usage scenarios. Here, it is easier to see how the passenger 121 extends her legs onto an upholstered platform 131 (i.e. footrest) while the lower portion 132 is used for storage of personal belongings.

Contrary to the herringbone variety 11 where the seat base is fixed, the staggered seat 12 uses the common sliding mechanism. In this approach, the seat base slides forward on a platform first before there is enough clearance for the backrest to recline into a fully flat position.

While the above detailed description has shown, described, and pointed out novel features as applied to various embodiments, it may be understood that various omissions, substitutions, and changes in the form and details of the illustrated embodiments may be made without departing from the spirit of the disclosure. As may be recognized, certain embodiments of the systems described herein may be embodied within a form that does not provide all of the features and benefits set forth herein, as some features may be used or practiced separately from others. Additionally, features described in connection with one embodiment can be incorporated into another of the disclosed embodiments, even if not expressly discussed herein, and the prosthetic device having the combination of features still fall within the scope of the invention. For example, features described above in connection with one embodiment can be used with a different embodiment described herein and the combination still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this invention may comprise, additional to its essential features described herein, one or more features as described herein from each other embodiment of the invention disclosed herein.

Features, materials, characteristics, or groups described in conjunction with a particular aspect, embodiment, or example are to be understood to be applicable to any other aspect, embodiment, or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A plurality of flat-bed seats arranged adjacent to each other in a "herringbone" configuration along an aisle of a transport vehicle, each of the seats comprising:
    a seat bottom configured to receive a lower posterior of a person seated; and
    a backrest configured to receive a back of the person seated when the backrest is in an upright position, wherein the backrest is configured to pivot to a reclined position allowing the person seated to move to a laying-down position supported by the seat bottom and the backrest;
    a privacy wall extending along one side, the privacy wall configured to be reversibly lowered to create a shared common space with an adjacent seat that is also one of the plurality of flat-bed seats; and
    wherein the plurality of seats are arranged along the aisle at an angle between 52° to 62° with respect to the aisle, and
    wherein the privacy wall is configured to lower to below a height of the backrest or the seat bottom in the reclined position to create the shared common space.

2. The plurality of flat-bed seats according to claim 1, wherein the seat bottom is in a fixed position such that the backrest can rotate into the reclined position without a sliding movement, and each of the seats further comprises a frame positioned to support the backrest when in the reclined position.

3. The plurality of flat-bed seats according to claim 1, wherein the privacy wall is at least partially opaque or translucent but not transparent.

4. A plurality of flat-bed seats arranged adjacent to each other in a "herringbone" configuration along an aisle of a transport vehicle, each of the seats comprising:
    a seat bottom configured to receive a lower posterior of a person seated; and
    a backrest configured to receive a back of the person seated when the backrest is in an upright position, wherein the backrest is configured to pivot to a reclined position allowing the person seated to move to a laying-down position supported by the seat bottom and the backrest;
    a privacy wall extending along one side, the privacy wall configured to be reversibly lowered to create a shared common space with an adjacent seat that is also one of the plurality of flat-bed seats; and
    a two-way authentication system configured to allow people in adjacent seats to mutually control a lowering or raising of the privacy wall, wherein the two-way authentication system is configured to be managed through at least one of a dedicated control panel of the seats or an inflight entertainment display of the seats;
    wherein the plurality of seats are arranged along the aisle at an angle between 52° to 62° with respect to the aisle.

5. The plurality of flat-bed seats according to claim 1, wherein two adjacent seats have a longitudinal offset no greater than 25 inches.

6. A plurality of flat-bed seats arranged adjacent to each other in a "herringbone" configuration along an aisle of a transport vehicle, each of the seats comprising:
    a seat bottom configured to receive a lower posterior of a person seated;
    a backrest configured to receive a back of the person seated when the backrest is in an upright position, wherein the backrest is configured to pivot to a reclined position allowing the person seated to move to a laying-down position supported by the seat bottom and the backrest;
    each of the seats further comprising a storage space behind the seat;
    wherein the plurality of seats are arranged along the aisle at an angle between 52° to 62° with respect to the aisle; and
    wherein the storage space is configured to be optionally accessed from an adjacent seat in order to stow and retrieve heavier items such as carry-on bags in a more ergonomic posture.

7. The plurality of flat-bed seats according to claim 1, each of the seats further comprising a tray table configured to be deployed in a serving position near the aisle in order to facilitate serving of meals by flight attendants, wherein the tray table is configured to rotate from the serving position near the aisle to a dining position substantially in the lap of a sitting person.

8. The plurality of flat-bed seats according to claim 1, each seat further comprising an inflight entertainment display configured to rotate from a stowed position to a viewing position about a first pivot, and further comprising a second pivot to adjust a viewing angle in a yaw direction.

9. A layout of seats for single aisle airliners where the plurality of flat-bed seats according to claim 1 are symmetrically placed with one column of seats by windows on each side.

10. The plurality of flat-bed seats according to claim 1, wherein the privacy wall is configured to lower to below the height of the backrest in the reclined position.

11. The plurality of flat-bed seats according to claim 10, wherein the privacy wall extends from the seat bottom to a region behind the backrest in the upright position.

12. The plurality of flat-bed seats according to claim 11, wherein the privacy wall extends along a backrest of the adjacent seat in a reclined position.

13. The plurality of flat-bed seats according to claim 10, wherein the privacy wall is configured to lower to a flat configuration.

14. The plurality of flat-bed seats according to claim 10, wherein the privacy wall comprises top and bottom portions.

* * * * *